(12) United States Patent
Chalamalasetti et al.

(10) Patent No.: US 12,524,500 B2
(45) Date of Patent: Jan. 13, 2026

(54) MACHINE LEARNING MODEL BIAS DETECTION AND MITIGATION

(71) Applicant: HEWLETT PACKARD ENTERPRISE DEVELOPMENT LP, Houston, TX (US)

(72) Inventors: Sai Rahul Chalamalasetti, Milpitas, CA (US); Dejan S. Milojicic, Milpitas, CA (US); Sergey Serebryakov, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1054 days.

(21) Appl. No.: 17/074,201

(22) Filed: Oct. 19, 2020

(65) Prior Publication Data

US 2022/0121885 A1  Apr. 21, 2022

(51) Int. Cl.
*G06N 20/00* (2019.01)
*G06F 17/18* (2006.01)
*G06F 18/21* (2023.01)

(52) U.S. Cl.
CPC .......... *G06F 18/2193* (2023.01); *G06F 17/18* (2013.01); *G06N 20/00* (2019.01)

(58) Field of Classification Search
CPC ...... G06F 18/2193; G06F 17/18; G06N 20/00
See application file for complete search history.

(56) References Cited

U.S. PATENT DOCUMENTS

| | | | |
|---|---|---|---|
| 10,460,255 | B2 | 10/2019 | Nagaraju et al. |
| 11,868,855 | B2 | 1/2024 | Chalamalasetti et al. |
| 2019/0156247 | A1* | 5/2019 | Faulhaber, Jr. .......... G06N 3/08 |
| 2020/0082299 | A1 | 3/2020 | Vasconcelos et al. |
| 2020/0134493 | A1 | 4/2020 | Bhide et al. |
| 2020/0143266 | A1 | 5/2020 | El-hay et al. |
| 2020/0184350 | A1* | 6/2020 | Bhide ....................... G06N 5/04 |
| 2020/0401930 | A1* | 12/2020 | Smirnov ................ G06N 20/00 |
| 2021/0319333 | A1* | 10/2021 | Lee .......................... G06N 3/08 |

(Continued)

OTHER PUBLICATIONS

Krasanakis, E. et al. "Adaptive Sensitive Reweighting to Mitigate Bias in Fairness-aware Classification," The 2018 World Wide Web Conference, Apr. 23-27, 2018, 11 pgs., Lyon, France. https://www.researchgate.net/publication/324516531_Adaptive_Sensitive_Reweighting_to_Mitigate_Bias_in_Fairness-aware_Classification.

(Continued)

*Primary Examiner* — Casey R. Garner
(74) *Attorney, Agent, or Firm* — Sheppard Mullin Richter & Hampton LLP

(57) ABSTRACT

Testing for bias in a machine learning (ML) model in a manner that is independent of the code/weights deployment path is described. If bias is detected, an alert for bias is generated, and optionally, the ML model can be incrementally re-trained to mitigate the detected bias. Re-training the ML model to mitigate the bias may include enforcing a bias cost function to maintain a level of bias in the ML model below a threshold bias level. One or more statistical metrics representing the level of bias present in the ML model may be determined and compared against one or more threshold values. If one or more metrics exceed corresponding threshold value(s), the level of bias in the ML model may be deemed to exceed a threshold level of bias, and re-training of the ML model to mitigate the bias may be initiated.

20 Claims, 9 Drawing Sheets

(56) References Cited

U.S. PATENT DOCUMENTS

2022/0012591 A1\* 1/2022 Dalli ...................... G06N 3/082
2022/0414539 A1\* 12/2022 Oren ................... G06F 11/3447

OTHER PUBLICATIONS

Lee, N.T. et al. "Algorithmic Bias Detection and Mitigation: Best Practices and Policies to Reduce Consumer Harms," May 22, 2019, 26 pgs., https://www.brookings.edu/research/algorithmic-bias-detection-and-mitigation-best-practices-and-policies-to-reduce-consumer-harms/.
Solomon, J., "Customization Bias in Decision Support Systems," Proceedings of the SIGCHI Conference on Human Factors in Computing Systems, Apr. 26-May 1, 2014, 11 pgs., AMC, Toronto, Ontario, Canada https://www.researchgate.net/publication/266655569_Customization_bias_in_decision_support_systems.
Yu et al., "A Bias-Variance-Complexity Trade-Off Framework for Complex System Modeling", ICCSA, 2006, pp. 518-527.
Frankle et al., "The Lottery Ticket Hypothesis: Finding Sparse, Trainable Neural Networks", Published as a conference paper at ICLR 2019, Mar. 4, 2019, 4442 pages.

\* cited by examiner

MACHINE LEARNING MODEL BIAS DETECTION AND MITIGATION

DESCRIPTION OF RELATED ART

As a general concept, bias in a machine learning (ML) model refers to hard assumptions that are made by the learning algorithm. Such assumptions, however, may not be appropriate in some instances. For example, linear models assume a linear dependency between independent and dependent variables, which may not be the case. Variance—another characteristic of ML models—refers to the sensitivity of an ML model to noise. There exists a tradeoff between the generalized concept of bias and variance. In particular, higher bias (e.g., hard assumptions that result in important relationships in data not being identified) is correlated with lower variance (i.e., less sensitivity to noise). Along the same lines, higher variance (e.g., greater sensitivity to noise) is correlated with lower bias. As a result, training an ML model involves striking a balance between the competing model properties of variance and bias.

In a broader sense, bias in an ML model may refer to the model's ability to produce outputs that are fair and non-discriminatory. That is, bias in an ML model may refer to the model's tendency to favor a particular class of input data over another class of input data. Stated another way, an ML model may exhibit bias in this broader sense if the probability of a wrong output is conditioned, at least in part, on the class of the input data.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
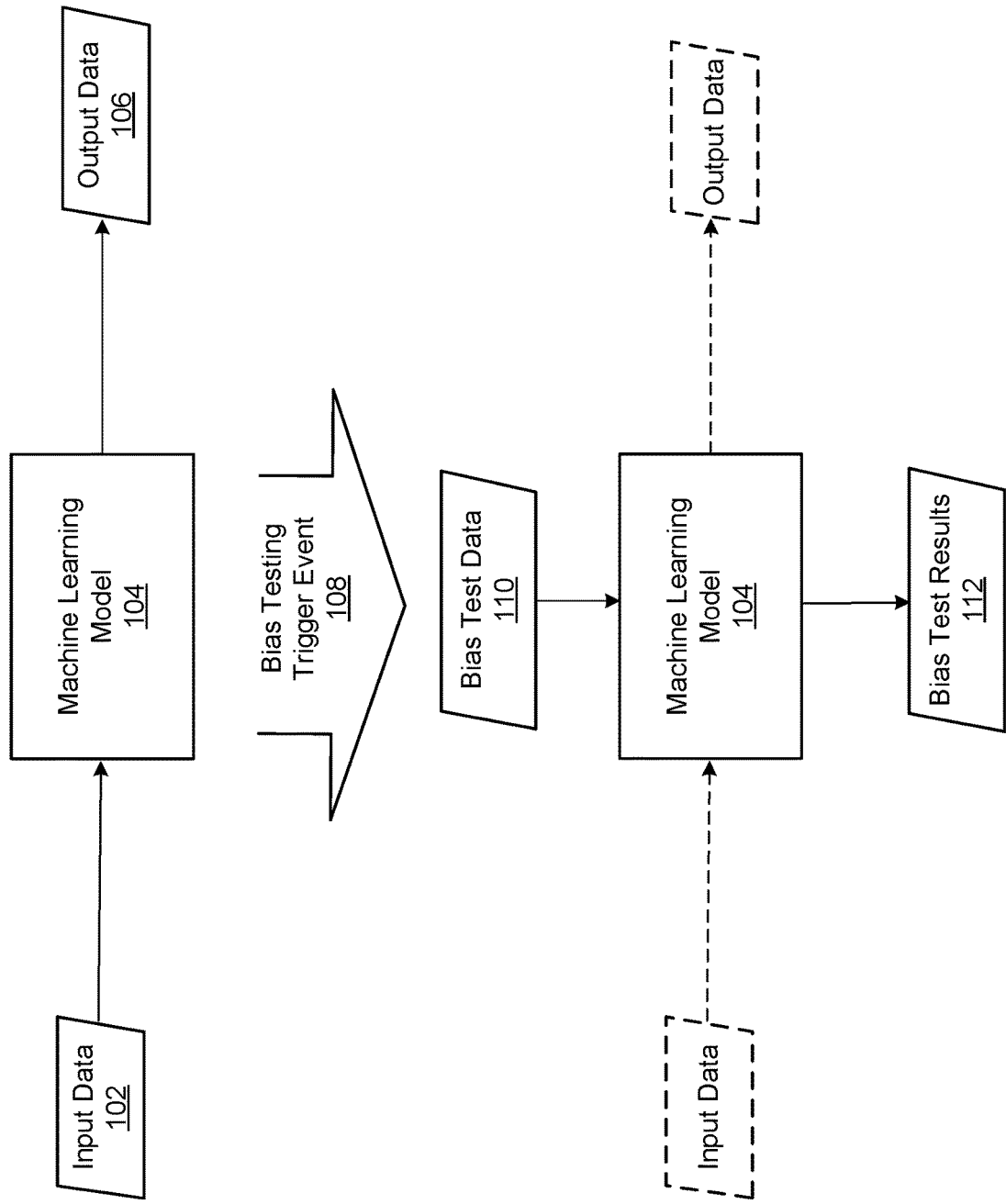
FIG. 1 depicts an example flowchart for testing a machine learning (ML) model for bias responsive to occurrence of a bias testing trigger event according to example embodiments of the invention.

The figures are not exhaustive and do not limit the present disclosure to the precise form disclosed.

DETAILED DESCRIPTION

Model accuracy and compute/memory requirements influence the successful deployment of machine learning (ML) (e.g., deep Learning (DL)) models in production. Model accuracy defines how often a model makes wrong decisions (e.g., classifying a stop sign as a speed limit sign) and compute/memory requirements drive the ability to deploy models on low-power edge devices. Traditionally, bias refers to hard assumptions made by learning algorithms. The bias-variance trade-off refers to an ML model's attempt to find a balance between the model's sensitivity to noise in data (i.e., high variance) and missing important relationships in the data (i.e., high bias).

Example embodiments of the invention relate to a broader concept of bias in machine learning models, in particular, a model's ability to produce outputs that are fair and non-discriminatory (i.e., not biased towards any particular class of input data). Generally speaking, an un-biased model is a model with a probability of generating a wrong decision that is not conditioned on the class of input data. In an example use case scenario involving potential ML model bias, a large number of video cameras may be deployed across public spaces as part of a city surveillance/crime prevention initiative. The cameras may be equipped, for example, with low-power edge artificial intelligence (AI) accelerators configured to run neural network models designed to identify and localize individuals that could pose a risk to public safety. At the same time, detailed crime-tracking statistics may be collected over time for the area being surveilled. In this example, deployed neural network models could be considered to exhibit bias if the distribution of suspicious activity alerts generated by the models across classes of input data is inconsistent with an expected distribution computed from the crime statistics. For instance, the deployed machine learning models may exhibit bias by improperly equating correlation between input data with causation, thereby potentially resulting in an overrepresentation of a particular output with respect to a particular class of input data. Classes of input data in this example could include race, ethnicity, age, sex, height, weight, facial characteristics, etc.

As ML/DL algorithms are increasingly being deployed to perform various tasks across various domains, the risk of intentional or unintentional bias in the algorithms increases. This is especially true as more and more ML algorithms are deployed at edge devices, edge systems, and/or data centers, and in particular, as code, weights, optimizations, etc. of the ML models are increasingly being deployed by independent entities across different administration domains. Example embodiments of the invention relate to systems, methods, non-transitory computer-readable media, techniques, and methodologies for periodically testing for bias in an ML model in a manner that is independent of the code/weights deployment path. If bias is detected, an alert for bias is generated, and optionally, the ML model can be incrementally re-trained to mitigate the detected bias.

In some embodiments, re-training the ML model to mitigate the bias may include enforcing a bias cost function to maintain a level of bias in the ML model below a threshold bias level. In some embodiments, one or more statistical metrics representing the level of bias present in the ML model may be determined and compared against one or more threshold values. If one or more metrics exceed corresponding threshold value(s), the level of bias in the ML model may be deemed to exceed a threshold level of bias, and re-training of the ML model to mitigate the bias may be initiated.

Example embodiments of the invention that permit testing for bias in an ML model independently of the code/weight deployment path for the ML model allows auditing and security authorities to independently and securely test for possible bias without being influenced by developers of the ML model or owners of the systems running the ML model. In particular, bias test data and corresponding expected bias test results may be owned and deployed separately from the code/weights of the ML model. In fact, the bias test data/expected bias test results and the code/weights may be associated with entirely different system administration domains. Separation of ownership/control of the ML model deployment from the bias testing of the deployed ML model strengthens the integrity of the bias testing by ensuring that the same individuals are not both developing the ML model and testing it for bias.

Referring now to FIG. 1, bias testing of an ML model responsive to occurrence of a bias testing trigger event is illustrated. An example ML model 104 is shown. The ML model 104 may be, for example, an artificial neural network (ANN) such as a modular neural network, a feedforward neural network, a radial basis function neural network, a self-organizing neural network, a recurrent neural network (RNN), a convolutional neural network (CNN), or the like. It should be appreciated that other types of DL/ML models are contemplated as well including, for example, decision trees, support vector machines (SVMs), regression analysis, and the like. The ML model 104 may employ any of a variety of types of learning algorithms including, without limitation, supervised learning, unsupervised learning, semi-supervised learning, reinforcement learning, self-learning, feature learning, anomaly detection, or the like.

In example embodiments, during typical operation, input data 102 is fed to the ML model 104, which in turn, generates corresponding output data 106 based on the input data 102. The input data 102 may be fed to the ML model 104 during, for example, an inference phase of operation of the ML model 104. In response to a bias testing trigger event 108, however, the typical input path may be halted, and bias test data 110 may be injected into the ML model 104 in lieu of the input data 102. In particular, the bias test data 110 may be passed through the ML model 104 weights and code to obtain output bias test results 112. As will be described in more detail in reference to subsequent Figures, the outputted bias test results 112 may be evaluated against expected bias test results corresponding to the bias test data 110 to detect the presence of bias in the ML model 104, determine the level of detected bias, and generate a bias alert, and optionally re-train the ML model 104 to mitigate the bias, if the level of detected bias exceeds a threshold bias level. In some embodiments, there may be multiple tuples of bias test data 110 and corresponding expected bias test results. The transition from providing the input data 102 to the ML model 104 to instead injecting the bias test data 110 into the ML model 104 is illustratively depicted in FIG. 1 by showing the input data 102 and the output data 106 in dashed lines subsequent to detection/occurrence of the bias testing trigger event 108.

In some embodiments, the bias testing trigger event 108 may be the detected deployment of new/updated weights or code for the ML model 104. In some embodiments, the bias testing trigger event 108 may be the detected deployment of new/updated bias test data 110. In some embodiments, the bias testing trigger event 108 may be the detected occurrence of a new testing interval corresponding to a configurable testing frequency. For instance, the bias test data 110 may be periodically injected into the ML model 104 in accordance with a preselected testing frequency (e.g., daily, hourly, etc.).

Figure 2:
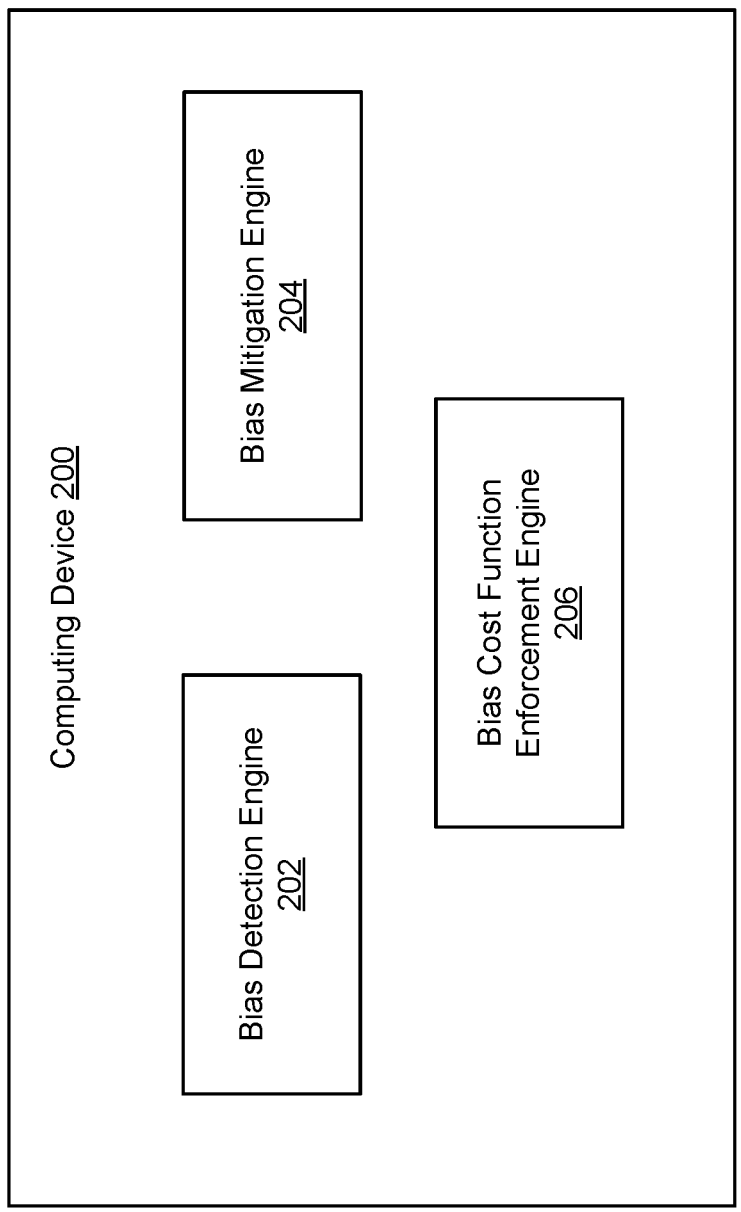
FIG. 2 depicts an example implementation of a computing device configured to execute various example processing engines for performing bias detection and mitigation for an ML model according to example embodiments of the invention.

FIG. 2 illustrates an example computing device 200 in which example embodiments of the technology may be implemented. The example computing device 200 is provided for illustrative purposes only and should not be interpreted as limiting the applicability of the technology to only the depicted implementation. In some embodiments, the computing device 200 may be an edge computing device such as a desktop computer; a laptop computer; a tablet computer/device; a smartphone; a personal digital assistant (PDA); a wearable computing device; a gaming console; another type of low-power edge device; or the like.

In example embodiments, the computing device 200 is configured to execute various computing engines, which in turn, are configured to provide corresponding functionality in connection with bias detection and mitigation in an ML model (e.g., the ML model 104). In particular, the computing device 200 may be configured to execute a bias detection engine 202, a bias mitigation engine 204, and a bias cost function enforcement engine 206. These engines can be implemented in any combination of hardware, software, and/or firmware. In some embodiments, one or more of these engines can be implemented, at least in part, as software and/or firmware modules that include computer-executable/machine-executable instructions that when executed by a processing circuit cause one or more operations to be performed. In some embodiments, these engines may be customized computer-executable logic implemented within a customized computing machine such as a customized field programmable gate array (FPGA) or an application specific integrated circuit (ASIC). A system or device described herein as being configured to implement example embodiments of the invention (e.g., the computing device 200) can include one or more processing circuits, each of which can include one or more processing units or cores. These processing circuit(s) may be configured to execute computer-executable code of these various engines to cause input data contained in or referenced by the computer-executable program code to be accessed and processed by the processing unit(s)/core(s) to yield output data. It should be appreciated that any description herein of an engine performing a function inherently encompasses the function being performed responsive to computer-executable/machine-executable instructions of the engine being executed by a processing circuit.

In example embodiments, the bias detection engine 202 may include computer-executable/machine-executable instructions that, responsive to execution by a processing circuit, cause bias detection functions to be performed. The bias detection functions may include monitoring for a bias testing trigger event, and responsive to detection of the occurrence of such an event, transitioning to a different input data path for an ML model (e.g., the ML model 104) according to which bias test data (e.g., bias test data 110) is injected into the ML model in lieu of other input data (e.g., the input data 102). The bias detection functions performed by the bias detection engine 202 may further include comparing the bias test output of an ML model for the bias test data to expected bias test results to determine whether bias is present in the ML model, and if so, the level of bias present, and comparing the bias level to a threshold bias level to determine whether a bias alert should be generated, and optionally, whether the ML model should be re-trained to mitigate the bias present in the model.

The bias mitigation engine 204 may include computer-executable/machine-executable instructions that, responsive to execution by a processing circuit, cause bias mitigation functions to be performed. Bias mitigation functions may include, for example, incrementally re-training an ML model to mitigate detected bias in the model. Mitigating bias in the ML model may correspond to lowering and maintaining the bias in the ML model to at or below a threshold bias level. Bias mitigation functions may also include aggregating multiple individual biases associated with multiple ML model deployments and using the aggregated bias to re-train an ML model.

The bias cost function enforcement engine 206 may include computer-executable/machine-executable instructions that, responsive to execution by a processing circuit, cause a bias cost function to be enforced as part of the bias mitigation functions performed by the bias mitigation engine 204. The bias cost function enforced by the bias cost function enforcement engine 206 may be a configurable equation that is sensitive to both aggregate and individual ML model bias. When, for example, a level of detected bias in an ML model exceeds a threshold level of bias, the bias mitigation engine 204 may initiate re-training of the ML model using the bias test data based on which the ML model produced the biased output. In some embodiments, the bias cost function enforcement engine 206 may request re-training of an ML model according to a configurable training frequency (e.g., once daily, multiple times a day, etc.). In example embodiments, the bias test data is first labeled to indicate the expected output prior to using the bias test data to re-train an ML model. In example embodiments, bias detection during an inference phase of an ML model and subsequent re-training of the ML model may allow the ML model to mitigate or entirely eliminate bias from future inferences made by the ML model.

Figure 3:
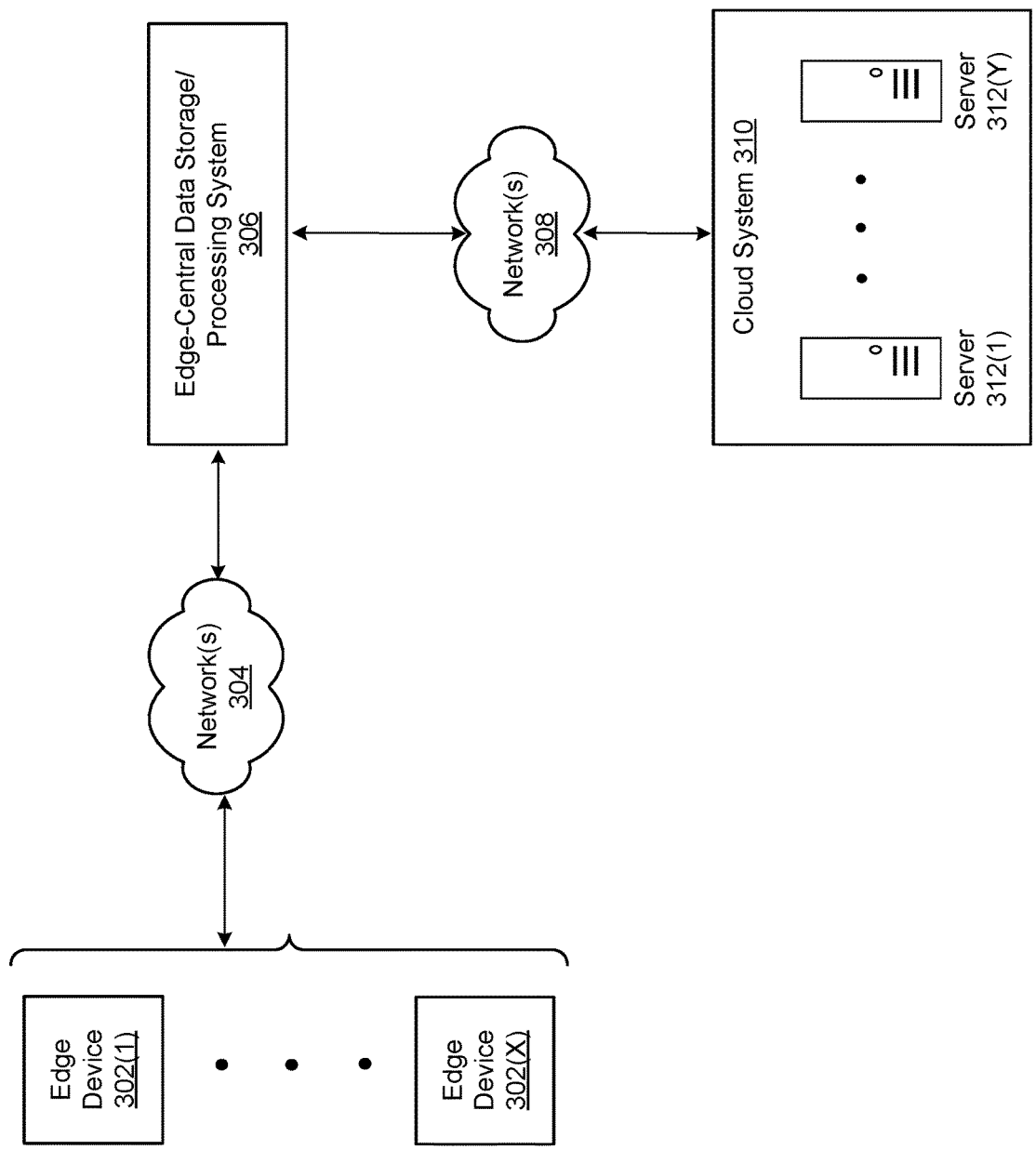
FIG. 3 depicts an example networked architecture in which the computing device of FIG. 2 is deployable according to example embodiments of the invention.

FIG. 3 depicts an example networked architecture in which the computing device 200 of FIG. 2 is deployable according to example embodiments of the invention. The networked architecture may include one or more edge devices 302(1)-302(X) (generically referred to herein as edge device 302), where X is an integer greater than or equal to one. An edge device 302 may be a node that sits at a network edge such as a camera in the city surveillance example use case discussed earlier. In some embodiments, an edge device 302 may be any relatively low-power device at a network edge. In some embodiments, the computing device 200 of FIG. 2 may be an edge device 302, in which case, the machine learning inference, and as a result, the bias detection, may occur at the edge device 302.

In other example embodiments, batch-based machine language inference processing may be performed at an edge-central data storage/processing system 306 of the networked architecture. That is, the edge-central system 306 may be communicatively coupled to the edge devices 302 via one or more networks 304. The edge-central system 306 may receive input data (e.g., image data from cameras) from multiple edge devices 302 via the network(s) 304 and execute machine learning inference on the input data. In some embodiments, the edge-central system 306 may aggregate the input data prior to executing the machine learning inference.

The edge-central system 306 may be further communicatively coupled to a cloud system 310 via one or more networks 308. The network(s) 304 and the network(s) 308 can include any combination of wireless and/or wired network(s) including, but not limited to, a local area network (LAN); a wide area network (WAN); a cellular network; a public communications network such as the Internet; or any other suitable network. In some embodiments, the network(s) 304 may include one or more LANs that connect the edge devices 302 with the edge-central system 306, and the network(s) 308 may include one or more WANs, the Internet, or the like via which the edge-central system 306 and the cloud system 310 can communicate.

The cloud system 310 may include one or more servers 312(1)-312(Y) (generically referred to herein as server 312), where Y is any integer greater than or equal to one. In example embodiments, the servers 312 may include a bare metal x86 server, a virtual machine, a container, or the like. The servers 312 may have any suitable arrangement/configuration including, without limitation, server clusters, server racks, etc.

In those example embodiments in which ML models are deployed at the edge devices 302, the output results obtained from injecting the bias test data into the ML models may be sent from the edge devices 302 to the edge-central system 306 and logged at the system 306. In some embodiments, the edge-central system 306 may store the bias test data and corresponding expected bias test results, and may send the bias test data to an edge device 302 having an ML model deployment in response to detection of a bias testing trigger event such as a change in the bias test data or a change to the code/model weights for the ML model deployment. In other embodiments, an edge device 302 having an ML model deployment may continuously store the bias test data and inject it into the ML model (without having to request the bias test data from the edge-central system 306) responsive to detecting a bias testing trigger event or being informed of the detection of a bias testing trigger event from the edge-central system 306.

In some embodiments, the edge-central system 306 may receive and log the bias test results outputted from deployed ML models based on the bias test data. The edge-central system 306 may, for example, receive the bias test results from one or more of the edge devices 302 at which the ML models are deployed. In some embodiments, an edge device 302 may be configured to perform bias detection alone, while the re-training of an ML model with detected bias may be performed at the edge-central system 306 or at the cloud system 310. In other example embodiments, an edge device 302 may be configured to perform both bias detection and bias mitigation. In those example embodiments in which the edge-central system 306 is configured to perform bias mitigation (e.g., re-training of an ML model using labeled bias test data), machine learning training accelerators may be deployed at the edge-central system 306 to enable the ML model re-training. In those example embodiments in which the cloud system 310 is configured to perform the bias mitigation, the edge-central system 306 may broadcast the bias test results to the cloud system 310, where one or more graphical processing units (GPUs) or the like running on the servers 312 may be configured to re-train one or more ML models. In example embodiments, the cloud system 310 may reside at a centralized data center, for example. Once re-trained by the edge-central system 306 or the cloud system 310, the ML model may be redeployed at an edge device 302.

Figure 4A:
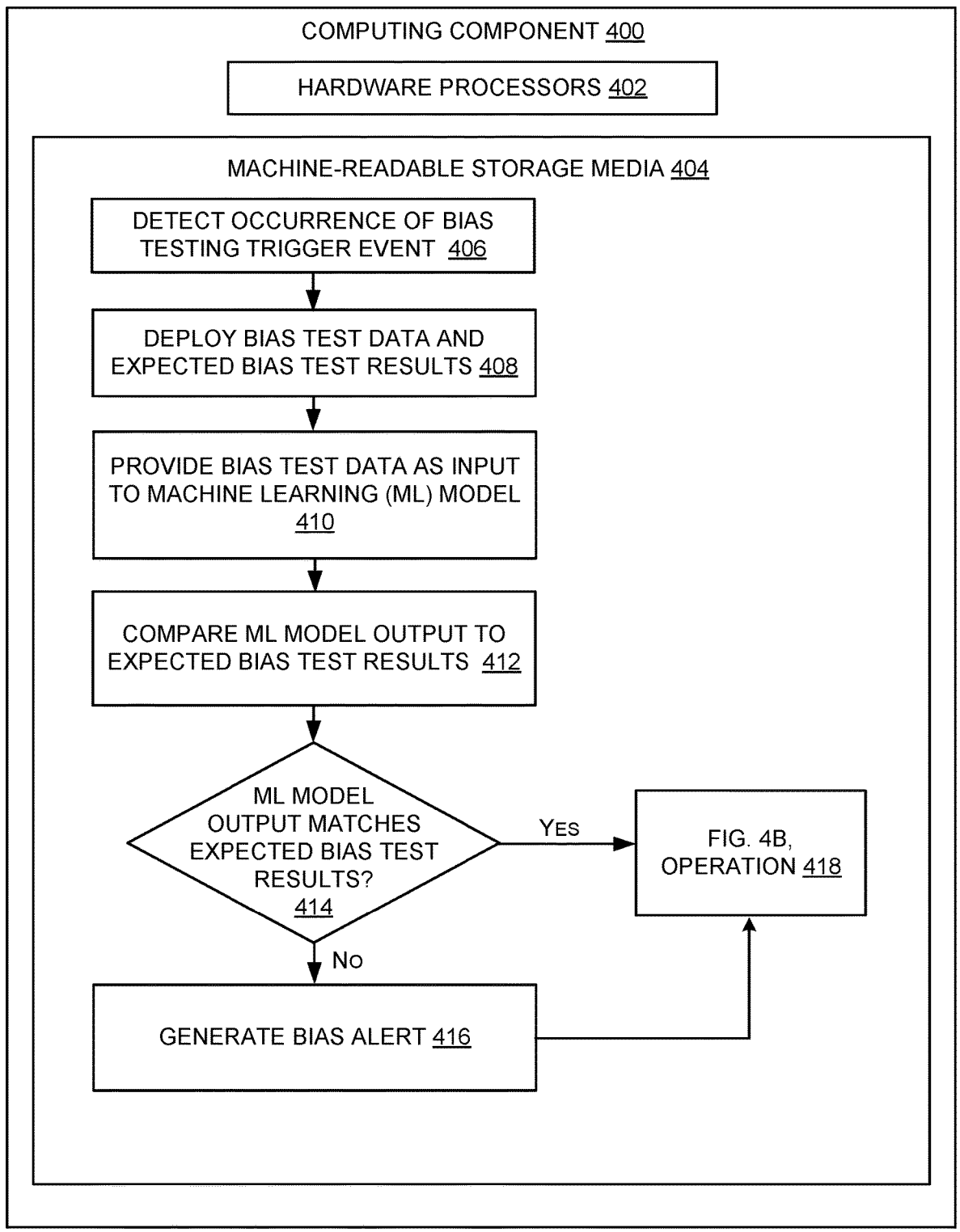
FIGS. 4A-4B depict a set of executable instructions stored in machine-readable storage media that, when executed, cause one or more hardware processors to perform an illustrative bias detection method for an ML model according to example embodiments of the invention.
Figure 4B:
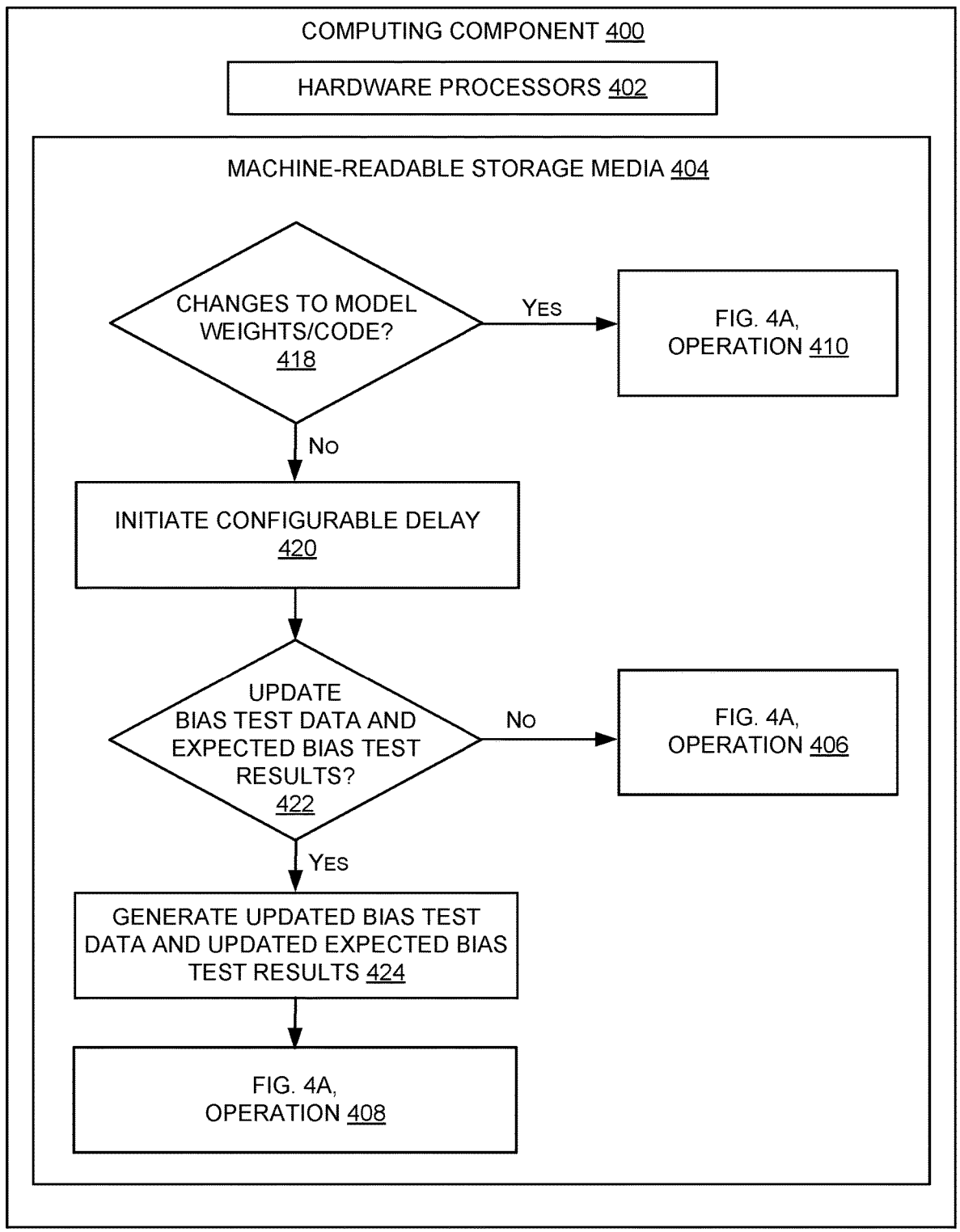

FIGS. 4A-4B depict a computing component 400 that includes one or more hardware processors 402 and machine-readable storage media 404 storing a set of machine-readable/machine-executable instructions that, when executed, cause the hardware processors 402 to perform an illustrative bias detection method for an ML model according to example embodiments of the invention. The computing component 400 may be, for example, the computing device 200 depicted in FIG. 2, the computing system 800 depicted in FIG. 8, or another computing device described herein. The hardware processors 402 may include, for example, the processor(s) 804 depicted in FIG. 8 or any other processing unit described herein. The machine-readable storage media 404 may include the main memory 806, the read-only memory (ROM) 808, the storage 810, or any other suitable machine-readable storage media described herein. FIGS. 4A-4B will be described hereinafter in reference to FIGS. 1-3.

Referring first to FIG. 4A, at block 406, instructions of the bias detection engine 202 may be executed by the hardware processors 402 to monitor for and detect a bias testing trigger event 108. The bias testing trigger event 108 may be a change to the code and/or weights of the ML model 104. In some embodiments, the bias testing trigger event 108 may be a change to the bias test data 110 and the expected bias test results corresponding to the bias test data 110. In other embodiments, the bias testing trigger event 108 may be a predetermined period of time having elapsed from a most recent time that the bias test data 110 was injected into the ML model 104 in accordance with a bias testing frequency/schedule.

At block 408, instructions of the bias detection engine 202 may be executed by the hardware processors 402 to deploy the bias test data 110 and the expected bias test results corresponding to the bias test data 110. Deploying the bias test data 110 and the corresponding expected bias test results may include, for example, the edge-central system 306 sending the bias test data 110 to an edge device 302 having the ML model 104 deployed thereon.

At block 410, instructions of the bias detection engine 202 may be executed by the hardware processors 402 to provide the bias test data 110 as input to the ML model 104. In example embodiments, the bias detection engine 202 may interrupt the typical flow of the input data 102 to the ML model 104 and may replace it by injecting the bias test data 110 into the ML model 104.

At block 412, instructions of the bias detection engine 202 may be executed by the hardware processors 402 to compare the bias test results 112 outputted by the ML model 104 in response to the inputted bias test data 110 to expected bias test results for the bias test data 110. In example embodiments, comparing the bias test results 112 to the expected bias test results for the bias test data 110 may include determining a set of statistical metrics based on a deviation between the actual bias test results 112 and the expected bias test results.

Referring to the operation at block 412 in more detail, in example embodiments, the bias test data 110 may include a data set containing a BiasTestCount number of test examples. In some embodiments, the bias cost function enforcement engine 206 may cause the bias cost function to iterate a configurable number of times through the BiasTestCount number of test examples. In some embodiments, a daily number of times the bias test data 110 is injected into the ML model 104 (DailyCount) may be given by the following equation: DailyCount=24 h*HourlyFrequency, HourlyFrequency$\in \mathbb{Z}^+$. The bias cost function may iterate through the bias test data 110 at predetermined timestamps such that the total number of times the bias test data 110 is fed into the ML model 104 equals the DailyCount. In some embodiments, the bias cost function enforcement engine 206 may inject the bias test data 110 into the ML model 104 in response to a bias testing trigger event 108 such as a change to the code/weights of the ML model 104 and/or a change to the bias test data 110.

In example embodiments, the bias cost function returns a value Result[i] for each test example i, $i \in [1, \text{BiasTestCount}]$. Thus, the set of all Result[i] for $i \in [1, \text{BiasTestCount}]$ represents the set of bias test results 112 outputted by the ML model 104 for the inputted bias test data 110. In example embodiments, a metric BiasTest, which represents the deviation of an actual bias test result 112 from an expected bias test result for the i-th test example in the j-th run of the bias test data 110, $j \in [1, \text{DailyCount}]$, may be calculated according to $\text{BiasTest}_{i,j} = \text{Result}_{i,j} - \text{BiasResult}_{i,j}$ (Eq. 1).

Additional statistical metrics may then be calculated using Equation 1 such as various metrics representative of average bias in the ML model 104. For example, the average bias for the i-th test example across the set of test runs $\{1, \ldots, \text{DailyCount}\}$, which is represented herein by the metric AvgBiasPerTest, may be calculated according to the following equation:

$$AvgBiasPerTest_i = \frac{1}{DailyCount} \sum_{j=1}^{J=DailyCount} BiasTest_{i,j}. \quad \text{(Eq. 2)}$$

Similarly, the average bias for the j-th test run across the set of all test examples $\{1, \ldots, \text{BiasTestCount}\}$ constituting the bias test data 110, which is represented herein by the metric AvgBiasPerRun, may be calculated according to the following equation:

$$AvgBiasPerRun_j = \frac{1}{BiasTestCount} \sum_{i=1}^{i=BiasTestCount} BiasTest_{i,j}. \quad \text{(Eq. 3)}$$

Further statistical metrics representative of accumulated bias in the ML model 104 may also be determined. For instance, the accumulated bias for the i-th test example across the set of test runs $\{1, \ldots, \text{DailyCount}\}$, which is represented by the metric BiasAccumPerTest, may be calculated according to the following equation: $\text{BiasAccumPerTest}_i = \sum_{j=1}^{j=DailyCount} |\text{BiasTest}_{i,j}|$ (Eq. 4). In addition, the accumulated bias for the j-th test run across the set of all test examples $\{1, \ldots, \text{BiasTestCount}\}$, which is represented herein by the metric BiasAccumPerRun, may be calculated according to the following equation: $\text{BiasAccumPerRun}_j = \sum_{i=1}^{i=BiasTestCount} |\text{BiasTest}_{i,j}|$ (Eq. 5). An overall accumulated bias in the ML model 104 with respect to all test runs of all test examples, which is represented herein by the metric BiasAccum, may also be calculated, according to the following equation: $\text{BiasAccum} = \sum_{j=1}^{j=DailyCount} \text{BiasAccumPerRun}_j$ (Eq.6).

In example embodiments, more complex statistical metrics may also be calculated such as the standard deviation of bias per test example or the standard deviation of bias per test run. The standard deviation for the i-th test example across the set of test runs $\{1, \ldots, \text{DailyCount}\}$, which is represented herein by the metric BiasStdDevPerTest, may be calculated according to the following equation:

$$BiasStdDevPerTest_i = \sqrt{\frac{1}{DailyCount} * \sum_{j=1}^{j=DailyCount}(AvgBiasPerTest_i - BiasTest_{i,j})^2} \quad \text{(Eq. 7)}$$

Similarly, the standard deviation for the j-th test run across the set of all test examples {1, . . . , BiasTestCount}, which is represented herein by the metric BiasStdDevPerRun, may be calculated according to the equation below.

$$BiasStdDevPerRun_j = \sqrt{\frac{1}{BiasTestCount} * \sum_{i=1}^{i=BiasTestCount}(AvgBiasPerRun_j - BiasTest_{i,j})^2} \quad \text{(Eq. 8)}$$

Using one or more of the above-mentioned statistical metrics, at block 414, instructions of the bias detection engine 202 may be executed by the hardware processors 402 to determine whether the ML model 104 output for the bias test data 110 (i.e., the bias test results 112) matches expected bias results for the bias test data 110. In some embodiments, the determination at block 414 may be equivalent to determining whether the level of bias detected in the ML model 104—as represented by one or more of the aforementioned statistical metrics—is below a threshold level of bias. In response to a negative determination at block 414, which may represent a determination that the detected level of bias in the ML model 104 exceeds a threshold level of bias, instructions of the bias detection engine 202 may be executed by the hardware processors 402 at block 416 to generate a bias alert. The bias alert may indicate to one or more interested parties (e.g., an auditor, an owner of the system running the deployed ML model 104, etc.) that bias has been detected in the ML model 104, that more than a threshold level of bias has been detected, or the like.

In some embodiments, a negative determination is made at block 414 if one or more of the accumulative metrics (BiasAccumPerTest, BiasAccumPerRun, BiasAccum) exceed corresponding preconfigured threshold values. In other example embodiments, a negative determination is made at block 414 if either of the standard deviation metrics (BiasStdDevPerTest, BiasStdDevPerRun) exceeds a corresponding threshold value. In some example embodiments, a negative determination at block 414 may require a threshold number of the accumulative and/or standard deviation metrics exceeding corresponding threshold value(s). In some example embodiments, a negative determination at block 414 may require at least one accumulative metric exceeding a corresponding threshold value and at least one standard deviation metric exceeding a corresponding threshold value. It should be appreciated that different statistical metrics than those described earlier may be generated and used to make the determination at block 414. For example, more complex statistical metrics including a bias result metric that represents the deviation between an actual bias test result and an expected bias test result as well as a distance vector as well as accumulative and/or standard deviation metrics across test examples and/or test runs for such a bias result metric may be determined. It should further be appreciated that alternative criteria than that described above may be used to evaluate one or more of the statistical metrics to determine if the level of detected bias in the ML model 104 calls for the generation of a bias alert.

In response to a positive determination at block 414 (e.g., a determination that the detected level of bias in the ML model 104 does not exceed the threshold level of bias), the method may proceed to block 418. The method may also proceed to block 418 from block 416, after the bias alert is generated. Referring now to FIG. 4B, at block 418, instructions of the bias detection engine 202 may be executed by the hardware processors 402 to determine whether any changes have occurred to the code and/or weights of the deployed ML model 104. As previously noted, changes to ML model code/weights may represent a type of bias testing trigger event. As such, in response to a positive determination at block 418, the bias detection method may again proceed from block 410, where the bias test data 110 is again injected into the deployed ML model 104. This may be done to determine if the level of bias in the deployed ML model 104 has changed due to the changed code/weights.

On the other hand, in response to a negative determination at block 418, the method may proceed to block 420, where a configurable delay may be initiated. The configurable delay may be initiated in order to provide the opportunity to detect any other potential bias testing trigger events. Then, at block 422, instructions of the bias detection engine 202 may be executed by the hardware processors 402 to determine whether any updates to the bias test data 110 and the corresponding expected bias test results are needed. In response to a negative determination at block 422, the bias detection method may again proceed from block 406, where the bias detection engine 202 may monitor for the occurrence of a bias testing trigger event, and upon detecting a bias testing trigger event, proceed to block 408 and so forth.

On the other hand, in response to a positive determination at block 422, the bias detection method proceeds to block 424, where instructions of the bias detection engine 202 are executed by the hardware processors 402 to update the bias test data 110 and corresponding expected bias test results to generate updated bias test data and corresponding updated expected bias test results. The updated bias test data and corresponding updated expected bias test results are then deployed at block 408 and the bias detection method proceeds accordingly.

Figure 5:
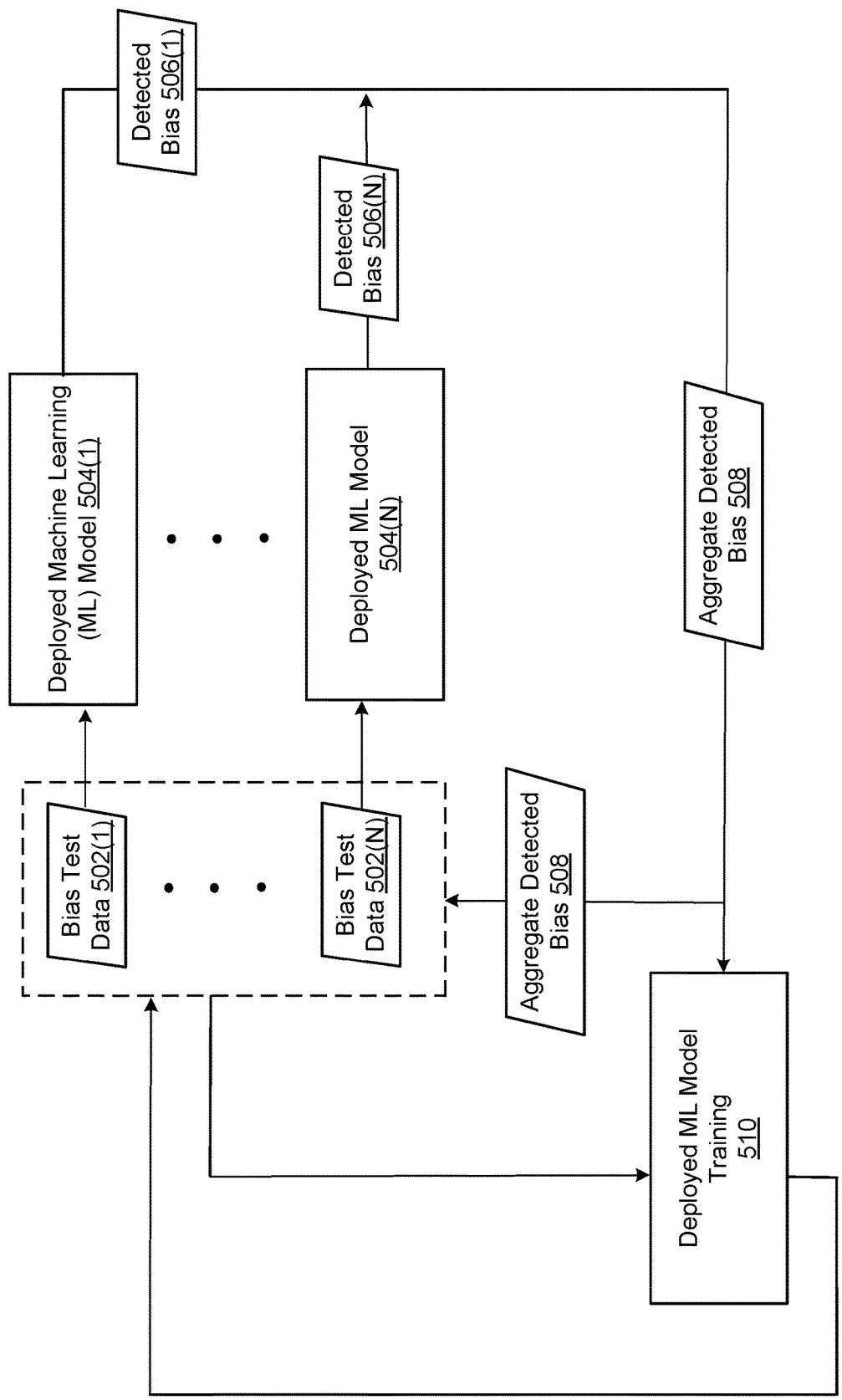
FIG. 5 depicts an example flowchart for incremental re-training of an ML model to mitigate bias according to example embodiments of the invention.
Figure 6:
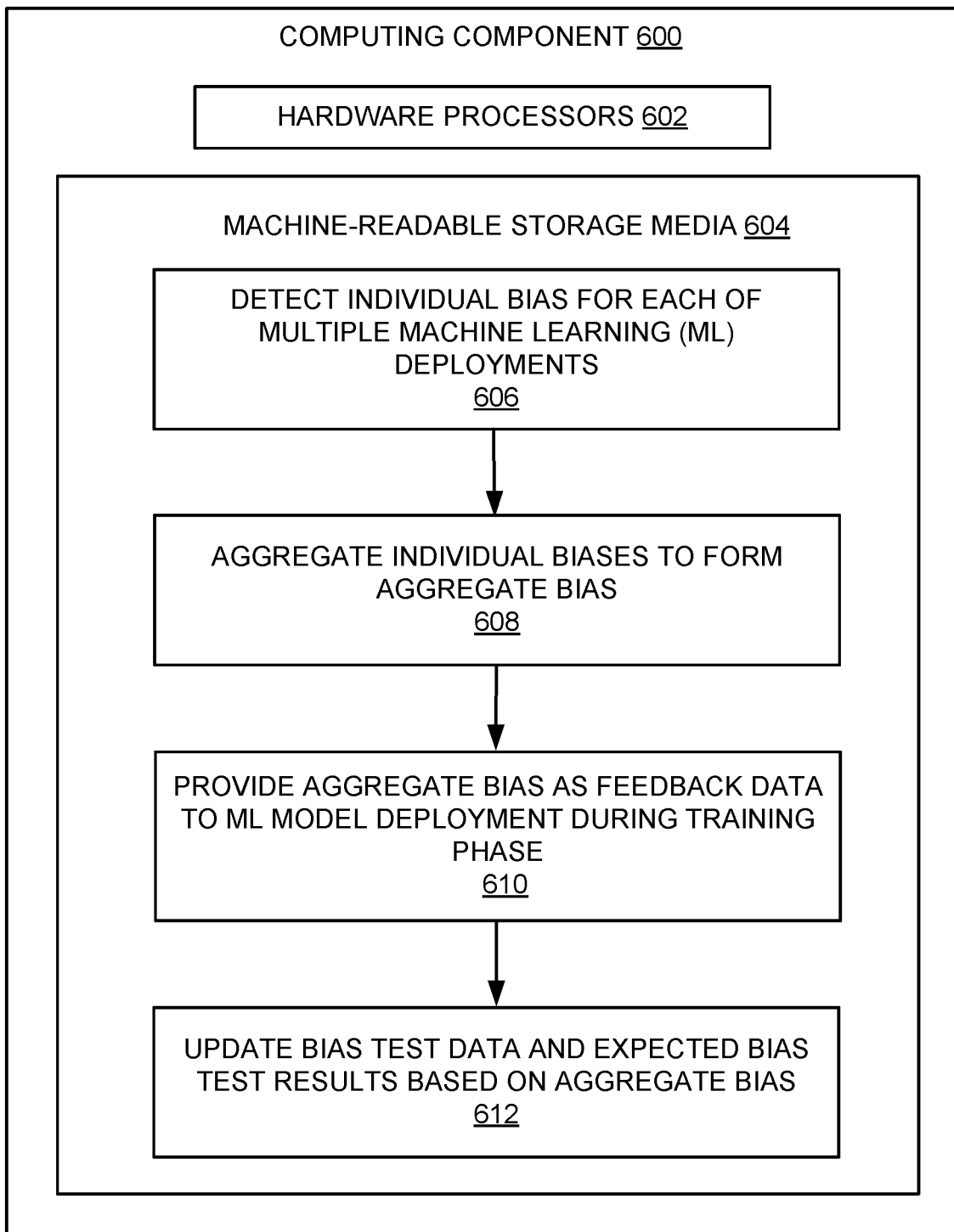
FIG. 6 depicts a set of executable instructions stored in machine-readable storage media that, when executed, cause one or more hardware processors to perform an illustrative method for incrementally re-training an ML model to mitigate bias according to example embodiments of the invention.

FIGS. 5 and 6 will be described in conjunction with one another hereinafter. FIG. 5 depicts incremental re-training of an ML model to mitigate bias according to example embodiments of the invention. FIG. 6 depicts a computing component 600 that includes one or more hardware processors 602 and machine-readable storage media 604 storing a set of machine-readable/machine-executable instructions that, when executed, cause the hardware processors 602 to perform an illustrative method for incrementally re-training an ML model to mitigate bias according to example embodiments of the invention. The computing component 600 may be, for example, the computing device 200 depicted in FIG. 2, the computing system 800 depicted in FIG. 8, or another computing device described herein. The hardware processors 602 may include, for example, the processor(s) 804 depicted in FIG. 8 or any other processing unit described herein. The machine-readable storage media 604 may include the main memory 806, the read-only memory (ROM) 808, the storage 810, or any other suitable machine-readable storage media described herein.

At block 606, in example embodiments, instructions of the bias detection engine 202 are executed by the hardware processors 602 to detect individual bias for each of multiple ML model deployments. For instance, referring to FIG. 5, bias test data 502(1)-502(N) may be respectively injected into ML model deployments 504(1)-504(N), where N is any integer greater than or equal to one. The bias detection engine 202 may execute the previously described bias detection method to detect and determine individual biases 506(1)-506(N), which respectively correspond to ML model deployments 504(1)-504(N). In some embodiments, the individual detected biases 506(1)-506(N) may include data indicative of the level of detected individual biases in the ML model deployments 504(1)-504(N) such as one or more of the statistical metrics described earlier that are representative of the detected biases.

Blocks 608-612 may represent operations performed in connection with bias mitigation, in particular, operations related to re-training an ML model to mitigate bias therein. At block 608, in example embodiments, instructions of the bias mitigation engine 204 may be executed by the hardware processors 602 to aggregate the multiple individual biases 506(1)-506(N) to form an aggregate detected bias 508. Then, at block 610, in example embodiments, instructions of the bias mitigation engine 204 may be executed by the hardware processors 602 to provide the aggregate bias 508 as feedback data to an ML model deployment during a training phase 510 for the ML model. Feeding the aggregate bias 508 back during ML model training 510 may allow for bias in the ML model deployment to be mitigated based on each of the individual biases 506(1)-506(N) detected in the individual ML model deployments 504(1)-504(N). Feeding the aggregate bias 508 back during ML model training 510 may include labeling one or more of the bias test data 502(1)-502(N) with corresponding expected bias test results and inputting the labeled bias test data to an ML model during training. It should be appreciated that ML model training 510 may correspond to re-training any number of the deployed ML models 504(1)-504(N).

At block 612, in example embodiments, instructions of the bias mitigation engine 204 may be executed by the hardware processors 602 to update one or more of the bias test data 502(1)-502(N) and the corresponding expected bias test results based on the aggregate bias 508. For instance, a particular set of bias test data (e.g., bias test data 502(K), where K is an integer between 1 and N inclusive) may be updated based on the individual biases detected for one or more of the ML model deployments 504(1)-504(N) for which bias test data other than 502(K) was inputted. In some embodiments, the same bias test data (e.g., bias test data 502(K)) may be injected into multiple ML model deployments, in which case, the bias test data 502(K) may be updated based on the aggregate bias corresponding to the individual biases detected for each of the multiple ML model deployments that received the bias test data 502(K) as input. In example embodiments, the deployed ML models 504(1)-504(N) may be re-tested for bias using the updated bias test data and corresponding expected bias test results.

The generation and use of an aggregate bias cost function (e.g., the aggregate bias 508) has applicability in a number of use case scenarios. For instance, the inference data from edge cameras in the surveillance use case described earlier or in any similar use case involving image data captured by multiple edge cameras (e.g., a no-interaction grocery store check-out model in which multiple cameras are used to track an individual's movement through the store and which items are selected by the individual) may be concatenated to form an aggregate result. This aggregate result may include an indication of aggregate bias associated with the individual inference data from each edge camera. In another example use case, user behavior data can be also collected and analyzed offline to identify user buying patterns indicative of grocery items located along high traffic flow routes, which could be biased at an aggregate level. In such an example use case, any individual bias detection at each camera may not be sufficient to detect aggregate level user patterns, which may be dependent on data collected across multiple cameras for multiple users. Thus, in such an example use case, an aggregate bias cost function can be implemented to determine the aggregate level bias.

Figure 7:
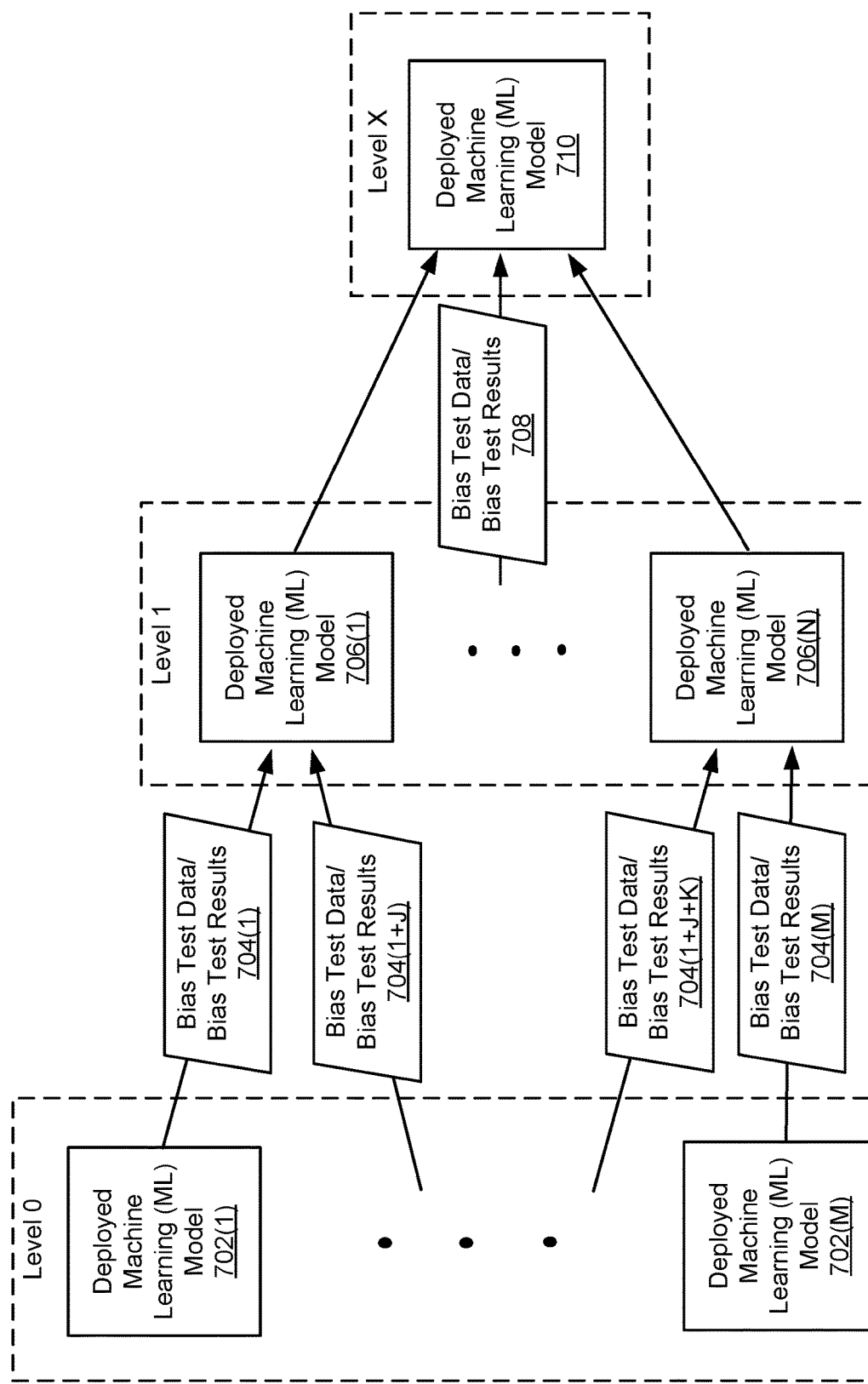
FIG. 7 depicts an example interleaved deployment of bias test data and corresponding bias test results across different systems and different hierarchical layers according to example embodiments of the invention.

FIG. 7 depicts an example interleaved deployment of bias test data and corresponding bias test results across different systems and different hierarchical layers according to example embodiments of the invention. As shown in FIG. 7, ML models may be deployed across multiple hierarchical levels, illustratively depicted as Level 0 to Level X. More specifically, Level 0 may include ML model deployments 702(1)-702(M), where M is any positive integer; Level 1 may include ML model deployments 706(1)-706(N), where N is any positive integer; and Level X may include ML model deployment 710. Level X may represent a highest (root) level of the hierarchy, and in the example of FIG. 7, represents any positive integer greater than or equal to two. In some embodiments, M and N may be positive integers greater than or equal to two, indicating that each level of the hierarchy has at least two ML model deployments. While only three illustrative levels of the hierarchy are shown, it should be appreciated that any number of additional levels having any number of corresponding ML model deployments may form part of the hierarchy.

As illustratively depicted in FIG. 7, bias test data/bias test results may be aggregated from ML model deployments at a given level (e.g., Level 0) and provided as input to one or more ML model deployments at a next higher level (e.g., Level 1) in the hierarchy. The bias test results referred to in FIG. 7 may include expected bias test results corresponding to the bias test data and/or actual bias test results outputted by an ML model in response to the bias test data. As an example, bias test data/bias test results 704(1) associated with the ML model deployment 702(1) at Level 0 may be aggregated with bias test data/bias test results 704(1+J) (where J is any positive integer) and provided as input to an ML model deployment 706(1) at Level 1. Similarly, bias test data/bias test results 704(1+J+K) associated with the ML model deployment 702(1+J+K) (where K is any positive integer) at Level 0 may be aggregated with bias test data/bias test results 704(M) and provided as input to an ML model deployment 706(N) at Level 1.

Bias test data/bias test results at any given level of the hierarchy can optionally be aggregated and provided as input to one or more deployed ML models at a next level in the hierarchy. For instance, as shown in FIG. 7, bias test data/bias test results 708 associated with any number of the ML model deployments 706(1)-706(N) may be provided as input to the ML model deployment 710 at Level X. It should be appreciated that while the bias test data/bias test results 704(1) is shown as being aggregated with bias test data/bias test results 704(1+J) and provided as input to a specific ML model deployment in Level 1 (i.e., deployed ML model 706(1)) and the bias test data/bias test results 704(1+J+K) is shown as being aggregated with bias test data/bias test results 704(M) and provided as input to a specific ML model deployment in Level 1 (i.e., deployed ML model 706(N)), any number of bias test data/bias test results from any number of ML model deployments at a given level in the hierarchy may be aggregated and provided as input to any number of ML model deployments at a next level in the hierarchy.

In some example embodiments, bias test data/bias test results may be distributed across the hierarchy depicted in FIG. 7 in order to provide a customized deployment of bias test data and bias test results. For instance, Level 0 may represent a local level in the hierarchy that corresponds to a local geography, culture, language/dialect, or the like. Bias test data/bias test results injected into an ML model deployment at the local level (e.g., Level 0) may be customized to reflect particular characteristics specific to the local environment in which the ML model is deployed. For instance, the bias test data/bias test results 704(1) provided as input to the deployed ML model 702(1) may be customized to test for localized bias that may be present in the ML model 702(1). As an example, if the ML model 702(1) is deployed in a local environment in which a particular language dialect is heavily represented, the bias test data/bias test results 704(1) may be customized to intentionally lower the representation of that input class in order to more effectively test for bias specific to the ML model 702(1). Any number of the bias test data/bias test results 704(1)-704(M) at the local level (e.g., Level 0) may then be aggregated and provided as input to one or more ML model deployments at a next level (e.g., Level 1). For instance, any number of customized local bias test data 704(1)-704(M) at Level 0 may be aggregated and provided as input to test for regional-level bias at Level 1. Similarly, any number of regional bias test data 706(1)-706(N) at Level 1 may be aggregated and provided as input to test for global-level bias at Level X.

While the hierarchy of FIG. 7 has been described above in connection with the example of customizing bias to test for bias at a local level and aggregating local biases to test for bias at a regional level, and so forth, the hierarchy of FIG. 7 is more generally applicable to any scenario in which bias test data is scaled and deployed in an interleaved manner across systems at different layers. In an example implementation, bias test data may be partitioned into subsets across the lowest level geographies or other distributed units, and then progressively aggregated at each subsequent level in the hierarchy.

Figure 8:
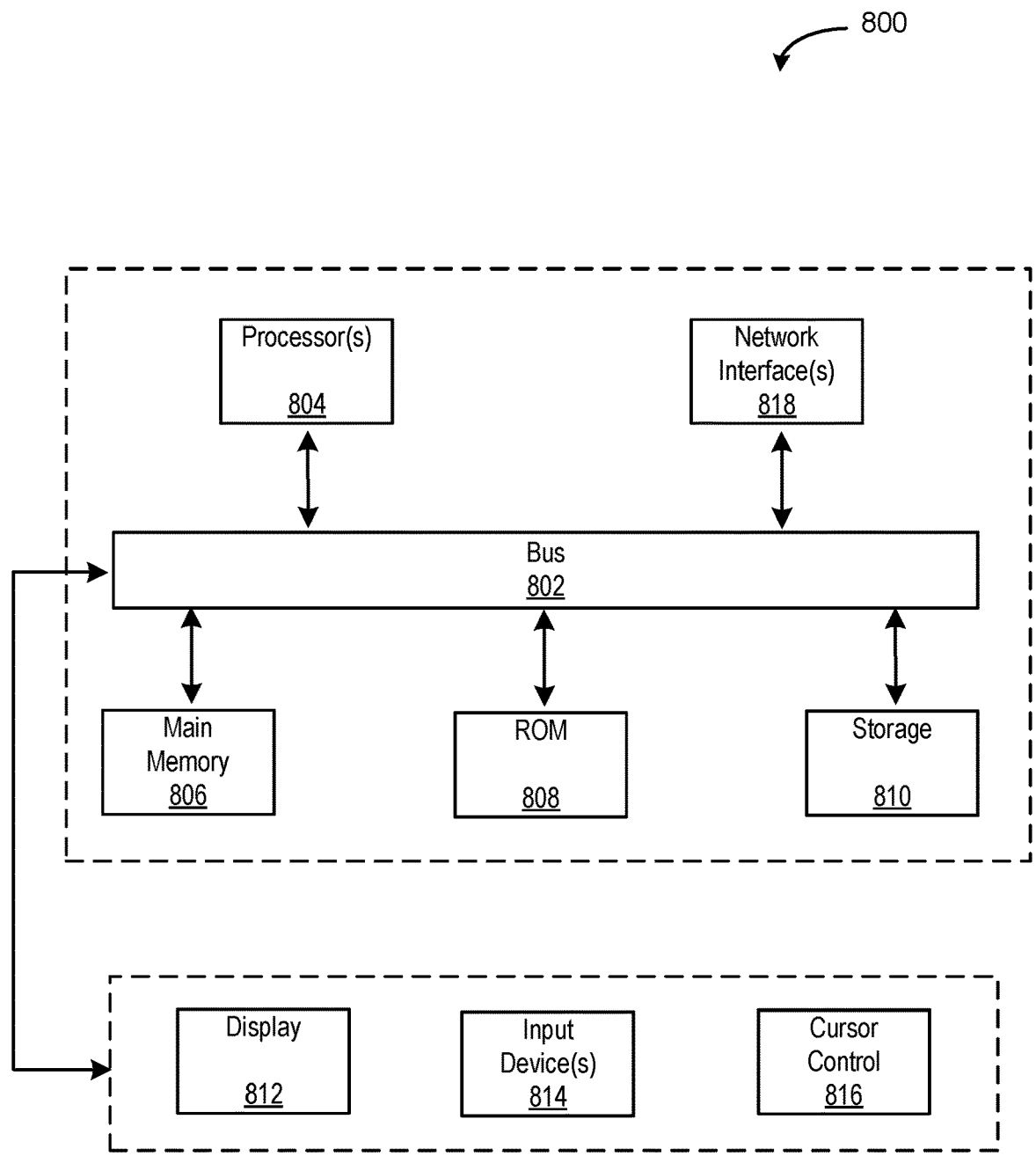
FIG. 8 is an example computing component that may be used to implement various features of example embodiments of the invention.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hardwired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicate with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    detecting a bias testing trigger event by determining that a determined time interval has passed since a dataset was last inputted to a machine learning model;
    inputting a first dataset to the machine learning model responsive to detecting the bias testing trigger event, wherein the first dataset is a bias test dataset designed to test for bias in the machine learning model;
    determining a deviation between an output of the machine learning model for the first dataset and an expected output for the first dataset;
    detecting a level of bias present in the machine learning model based at least in part on the deviation;
    determining that the detected level of bias exceeds a threshold level of bias; and
    re-training the machine learning model to mitigate the detected level of bias present in the machine learning model, wherein the machine learning model is temporally re-trained to mitigate bias for real-time machine learning inference performed by the machine learning model and re-training the machine learning model comprises enforcing a bias cost function to maintain a second level of bias in the machine learning model below the threshold level of bias.

2. The method of claim 1, further comprising updating the first dataset and the expected output for the first dataset based at least in part on the detected level of bias.

3. The method of claim 1, wherein detecting the level of bias present in the machine learning model comprises determining a set of statistical metrics based at least in part on the deviation.

4. The method of claim 3, wherein the set of statistical metrics comprises a first metric representative of average bias for each test example in a set of test examples in the first dataset across a set of test runs of the first dataset and a second metric representative of average bias for each test run in the set of test runs across the set of test examples.

5. The method of claim 4, wherein the set of statistical metrics further comprises a third metric representative of accumulated bias for each test example across the set of test runs and a fourth metric representative of accumulated bias for each test run across the set of test examples.

6. The method of claim 4, wherein the set of statistical metrics further comprises a fifth metric representative of a standard deviation in the first metric and a sixth metric representative of a standard deviation in the second metric.

7. The method of claim 3, wherein determining that the detected level of bias exceeds the threshold level of bias comprises determining that one or more metrics in the set of statistical metrics exceed a corresponding one or more threshold values.

8. The method of claim 1, further comprising:
    generating a bias alert responsive to determining that the detected level of bias exceeds the threshold level of bias.

9. The method of claim 1, wherein determined time interval corresponding to a configurable testing frequency.

10. The method of claim 1, wherein detecting the bias testing trigger event comprises detecting a change to a weight or code of the machine learning model.

11. The method of claim 1, wherein detecting the bias trigger event comprises detecting a need to update the first dataset, the method further comprising:
    updating the first dataset;
    updating the expected output for the first dataset; and
    inputting the updated dataset to the machine learning model.

12. The method of claim 1, wherein the machine learning model is associated with a first model deployment and the bias cost function is a first bias cost function, and wherein re-training the machine learning model to mitigate the detected level of bias present in the machine learning model comprises enforcing an aggregate bias cost function that aggregates the first bias cost function with at least a second bias cost function of a second model deployment.

13. The method of claim 1, further comprising customizing the first dataset to reflect one or more characteristics of a deployment of the machine learning model.

14. The method of claim 1, further comprising scaling bias detection by interleaving the first dataset across multiple machine learning model deployments associated with different levels in a deployment hierarchy.

15. A bias detection system for machine learning models, the system comprising:
    a memory storing machine-executable instructions; and
    a processor configured to access the memory and execute the machine-executable instructions to:
        detect a bias testing trigger event by determining that a determined time interval has passed since a dataset was last inputted to a machine learning model;
        input a bias test dataset to the machine learning model responsive to detection of the bias testing trigger event, wherein the bias test dataset is designed to test for the bias in the machine learning model;
        determine that an actual output of the machine learning model for the bias test dataset does not match an expected output for the bias test dataset;
        determine that bias is present in the machine learning model responsive to the determination that the actual output does not match the expected output; and
        re-train the machine learning model to mitigate the bias present in the machine learning model, wherein the machine learning model is temporally re-trained to mitigate bias for real-time machine learning inference performed by the machine learning model.

16. The system of claim 15, wherein the processor is configured to re-train the machine learning model by executing the machine-executable instructions to enforce a bias cost function to maintain a level of bias in the machine learning model below a threshold level of bias.

17. The system of claim 16, wherein the processor is further configured to execute the machine-executable instructions to:
    determine a first level of the bias in the machine learning model; and
    determine that the first level of the bias in the machine learning model exceeds the threshold level of bias,
    wherein the processor is configured to re-train the machine learning model responsive to the determination that the first level of the bias in the machine learning model exceeds the threshold level of bias.

18. A non-transitory computer readable storage medium storing instructions that, when executed by a processor, cause the processor to:
    detect a bias testing trigger event by determining that a determined time interval has passed since a dataset was last inputted to a machine learning model, the determined time interval corresponding to a configurable testing frequency;

input a bias test dataset to the machine learning model by inputting the bias test dataset responsive to detecting the bias testing trigger event;

determine a level of bias present in the machine learning model based at least in part on a deviation between an actual output of the machine learning model for the bias test dataset and an expected output for the bias test dataset;

determine that the level of bias exceeds a threshold level of bias;

generate a bias alert indicative of a detected presence of bias in the machine learning model; and re-train the machine learning model to lower the level of bias to below the threshold level of bias, wherein the machine learning model is temporally re-trained to mitigate bias for real-time machine learning inference performed by the machine learning model.

19. The system of claim 15, wherein the determine that bias is present in the machine learning model comprises determining a set of statistical metrics based at least in part on a deviation between the actual output and the expected output, wherein the set of statistical metrics comprises a first metric representative of average bias for each test example in a set of test examples in the bias test dataset across a set of test runs of the bias test dataset and a second metric representative of average bias for each test run in the set of test runs across the set of test examples.

20. The non-transitory computer readable storage medium of claim 18, wherein the determine the level of bias present in the machine learning model comprises determining a set of statistical metrics based at least in part on the deviation, wherein the set of statistical metrics comprises a first metric representative of average bias for each test example in a set of test examples in the bias test dataset across a set of test runs of the bias test dataset and a second metric representative of average bias for each test run in the set of test runs across the set of test examples.

* * * * *